(12) United States Patent
Sugiyama

(10) Patent No.: US 9,516,185 B2
(45) Date of Patent: Dec. 6, 2016

(54) INFORMATION PROCESSING APPARATUS ENABLING COOPERATION WITH A NETWORK SERVICE AND CONTROL METHOD THEREFOR

(71) Applicant: CANON KABUSHIKI KAISHA, Tokyo (JP)

(72) Inventor: Hideki Sugiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/729,550

(22) Filed: Jun. 3, 2015

(65) Prior Publication Data

US 2015/0358487 A1    Dec. 10, 2015

(30) Foreign Application Priority Data

Jun. 6, 2014    (JP) .................................. 2014-117650

(51) Int. Cl.
*H04N 1/00* (2006.01)
*H04L 29/08* (2006.01)

(52) U.S. Cl.
CPC ........... *H04N 1/00973* (2013.01); *H04L 67/02* (2013.01)

(58) Field of Classification Search
None
See application file for complete search history.

(56) References Cited

U.S. PATENT DOCUMENTS

| 7,457,839 | B2 * | 11/2008 | Nakamura | ............. G06F 9/445 358/1.16 |
| 2004/0109187 | A1 * | 6/2004 | Matsushima | ............ H04N 1/00 358/1.13 |
| 2014/0122610 | A1 * | 5/2014 | Jing | ........................ H04L 67/10 709/204 |
| 2014/0358802 | A1 * | 12/2014 | Biswas | ................. G06F 21/128 705/310 |

FOREIGN PATENT DOCUMENTS

JP    2008-197824 A    8/2008

* cited by examiner

*Primary Examiner* — Thomas D Lee
(74) *Attorney, Agent, or Firm* — Canon USA Inc., IP Division

(57) ABSTRACT

A first application installed on a multifunction peripheral (MFP) request a network communication unit to check a second application installed on the MFP to use an external service. The first application controls, according to a result of checking of the second application, registration processing for registering function information (intent element) used to cooperate with the external service by a relay function using a mechanism of Web Intents, or invocation processing by the relay function for invoking the external service using the registered function information.

11 Claims, 17 Drawing Sheets

FIG.6

```
<intent
    action="http://mysite.org/edit"
    type="image/*"
    href="edit.html"
    title="PHOTO EDITOR"
/>
```

FIG.7

| ID 701 | title 702 | href 703 | type 704 | action 705 | host 706 |
|---|---|---|---|---|---|
| 1 | PHOTO EDITOR | edit.html | Image/* | http://mysite.org/edit | http://mysite.org |
| 2 | SYNTHESIS GENERATOR | edit2.html | Image/* | http://mysite.org/edit | http://mysite2.org |
| 3 | ICON CREATION | edit3.html | Image/* | http://mysite.org/edit | http://mysite3.org |

FIG.10A

| No. 901 | application name 902 | ID 903 | type 904 | service host 905 | reference 906 | expiration date 907 | license 908 |
|---|---|---|---|---|---|---|---|
| 1 | application1 | 0123-4567-8901-abcd | 70 | | | 2030.3.31 | LIC0001 |
| 2 | application2 | 0123-4567-8901-aaaa | 70 | | | 2029.12.31 | LIC0002 |
| 3 | application3 | 0123-4567-8901-3333 | 100 | http://mysite.org | edit.html | 2015.3.31 | LIC0003 |

FIG.10B

| No. 901 | application name 902 | ID 903 | type 904 | service host 905 | reference 906 | expiration date 907 | license 908 | intent ID 909 |
|---|---|---|---|---|---|---|---|---|
| 1 | application1 | 0123-4567-8901-abcd | 70 | | | 2030.3.31 | LIC0001 | |
| 2 | application2 | 0123-4567-8901-aaaa | 70 | | | 2029.12.31 | LIC0002 | |
| 3 | application3 | 0123-4567-8901-3333 | 100 | http://mysite.org | edit.html | 2015.3.31 | LIC0003 | 1 |

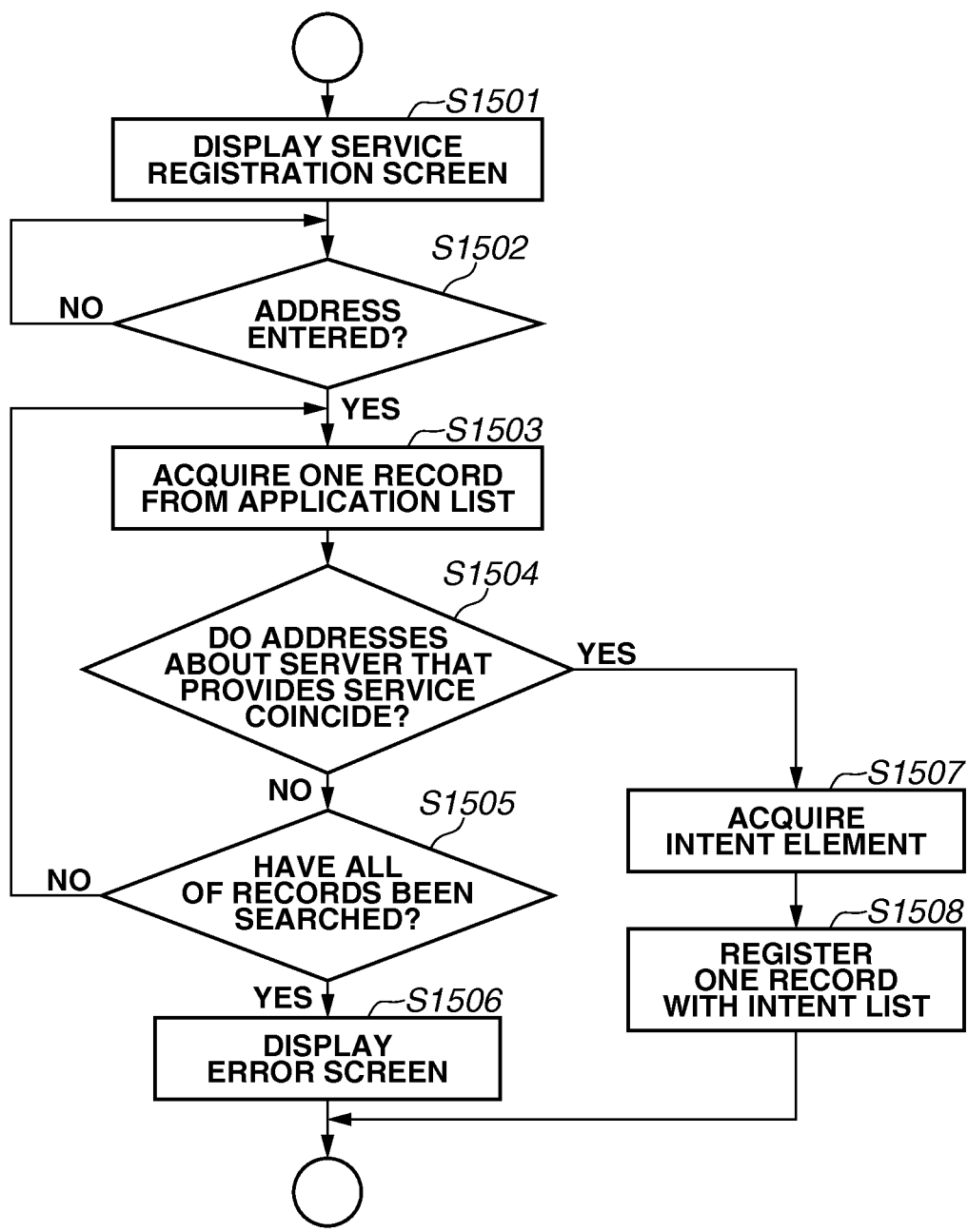

INFORMATION PROCESSING APPARATUS ENABLING COOPERATION WITH A NETWORK SERVICE AND CONTROL METHOD THEREFOR

BACKGROUND OF THE INVENTION

Field of the Invention

The present invention relates to technology for service management in information processing apparatuses that are capable of cooperating with an external service via a network.

Description of the Related Art

Recently, there has been developed an environment that allows an image processing apparatus, which is an example of an information processing apparatus, to expand functions of the image processing apparatus by installing an application thereon. Such an application can be prevented from being illegally installed or transferred, generally by managing the application using a license associated with information that identifies image processing apparatuses. In this way, the method of managing an application using a license can prevent an application that has been previously installed on an image processing apparatus and then has been copied onto another image processing apparatus from normally running.

Furthermore, with the advancement of sophisticated functions of image processing apparatuses, some image processing apparatuses have become equipped with a web browser. This has enabled image processing apparatuses to readily connect to a network.

Moreover, there has been published a technique called Web Intents, which facilitates the cooperation or collaboration between a plurality of applications without the use of a custom application programming interface (API) unique to a web application. It may be considered that the above-mentioned Web Intents technique can be loaded onto a web browser or the like mounted in image processing apparatuses.

Japanese Patent Application Laid-Open No. 2008-197824 discusses a method in which a main application utilizing an external application stores authentication information and plug-ins of an external service in association with the external application and uses the authentication information to access the external application.

However, in a case where an application running in an image processing apparatus cooperates with an external web application (hereinafter referred to as an "external service") via a network according to the method discussed in Japanese Patent Application Laid-Open No. 2008-197824, the conventional management of the application using a license cannot be applied to the cooperation with the external service.

In other words, the method discussed in Japanese Patent Application Laid-Open No. 2008-197824 does not enable the cooperation of an application running in an image processing apparatus, which is an example of an information processing apparatus, with a particular external service to be managed based on a license associated with the image processing apparatus. However, there is a demand to appropriately manage the cooperation between an information processing apparatus and an external service based on a license.

SUMMARY OF THE INVENTION

According to an aspect of the present invention, an information processing apparatus in which a relay function operates to cooperate with a service provided on a network includes a management unit configured to manage a plurality of applications installed on the information processing apparatus, the plurality of applications including a first application capable of using the service provided on the network, a checking unit configured to check, with the management unit, a second application different from the first application and installed to use the service provided on the network, and a control unit configured to control, according to a result of checking by the checking unit, registration processing by the relay function for registering function information used to cooperate with the service provided on the network or invocation processing by the relay function for invoking the service provided on the network using the registered function information.

Further features of the present invention will become apparent from the following description of exemplary embodiments with reference to the attached drawings.

BRIEF DESCRIPTION OF THE DRAWINGS

FIG. 6 illustrates an example of an intent element.

FIG. 7 illustrates an example of an intent list.

FIGS. 10A and 10B illustrate examples of application lists.

FIG. 17 is a flowchart illustrating an example of service registration processing according to a third exemplary embodiment.

DESCRIPTION OF THE EMBODIMENTS

Various exemplary embodiments, features, and aspects of the invention will be described in detail below with reference to the drawings. Constituent elements described in the following exemplary embodiments are merely examples, and the scope of the present invention is not intended to be limited only to those elements.

Figure 1:
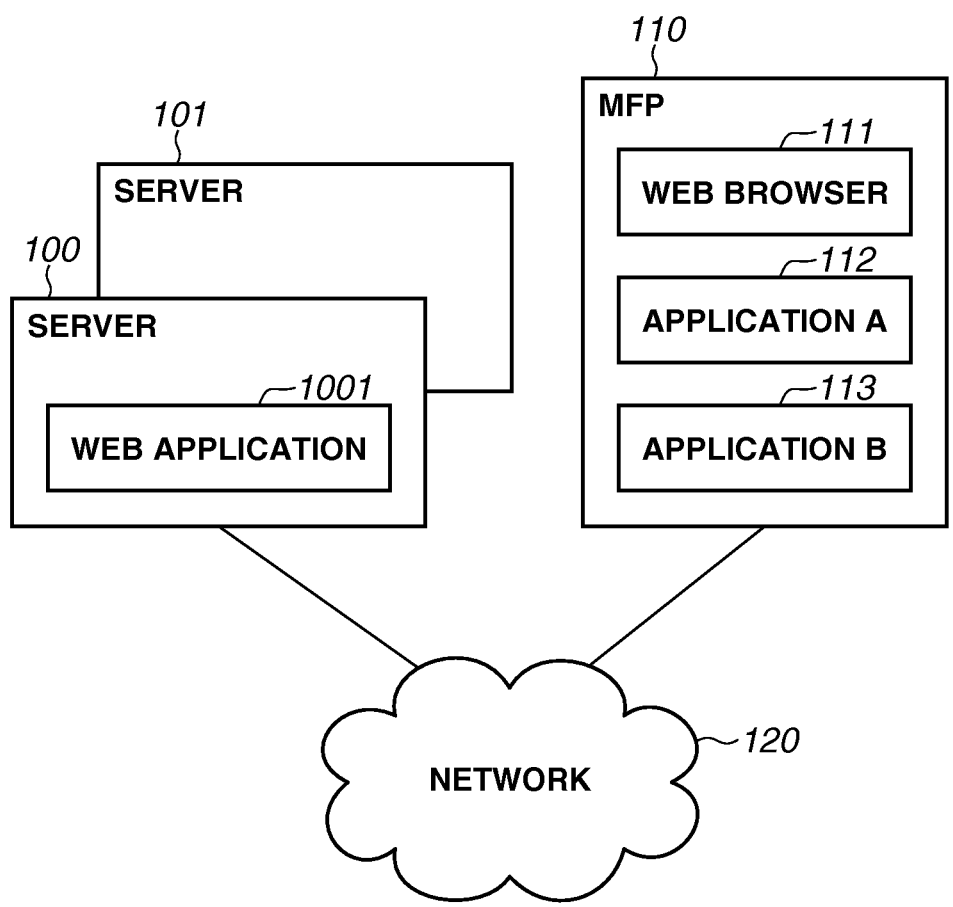
FIG. 1 is a configuration diagram of a network system including an image processing apparatus according to an exemplary embodiment of the present invention.

FIG. 1 illustrates an example of a configuration of a network system including an image processing apparatus according to an exemplary embodiment of the present invention.

Referring to FIG. 1, servers 100 and 101 each function as an information processing apparatus that provides an external service. The servers 100 and 101 each include a web application 1001 serving as a service. The web application 1001 transmits content information to a web browser in response to an instruction from the web browser or the like.

An image processing apparatus 110 functions as a device onto which various applications can be installed. All types of information processing apparatuses that allow various applications to run thereon can be the device 110 according to the present exemplary embodiment. In the present exemplary embodiment, for ease of description, a multifunction peripheral (MFP) having a plurality of functions, such as a printer function and a scanner function, is taken as an example of the device 110. In the following description, the term "MFP" means an image processing apparatus that allows an application to be installed thereon. Furthermore, hereinafter, the device 110 is referred to as the "MFP 110".

The MFP 110 includes a web browser 111. The web browser 111 receives an instruction from the user, communicates with a specified server according to the received instruction, acquires content from the server 100 or 101, and displays the content on a display unit (not illustrated).

The MFP 110 has an application A 112 and an application B 113 installed thereon. The application A 112 corresponds to a first application in the present exemplary embodiment. The application A 112 provides various functions on the MFP 110. The first application is able to use (able to cooperate with) a service provided on a network, such as the web application 1001, via a network communication unit 308 illustrated in FIG. 3, which is described below. The web browser 111 is also included in the first application.

The application B 113 corresponds to a second application in the present exemplary embodiment. In a case where a specified application installed on the MFP 110 (the first application) cooperates with an external service, it becomes necessary to install the second application on the MFP 110. The second application is installed to use a service provided on the network, and thus contains information used to identify an external service with which the MFP is permitted to cooperate, the details of which are described below. In the present exemplary embodiment, it is presumed that the second application does not have any special functions except containing information used to identify an external service with which the MFP is permitted to cooperate, the details of which are described below.

A network 120 is, for example, the Internet or an intranet. The MFP 110 can be connected to the server 100, the server 101, or another information processing apparatus via the network 120.

To enable an application that is managed by the present network system, it is necessary to install a license file on the MFP 110. Unless the license file is installed, the application is stopped from operating by the application management function of the MFP 110. The license file contains identification information of a target application and information used to identify an MFP serving as an install destination of the application.

The information used to identify an MFP is, for example, a serial number of the MFP, but may be other information, such as a media access control (MAC) address, as long as it is information that is usable to identify an MFP. To install the same application on another MFP, it is necessary to additionally install a license file containing identification information of the corresponding MFP. Such a mechanism can prevent unauthorized copying of software in an MFP.

Figure 2:
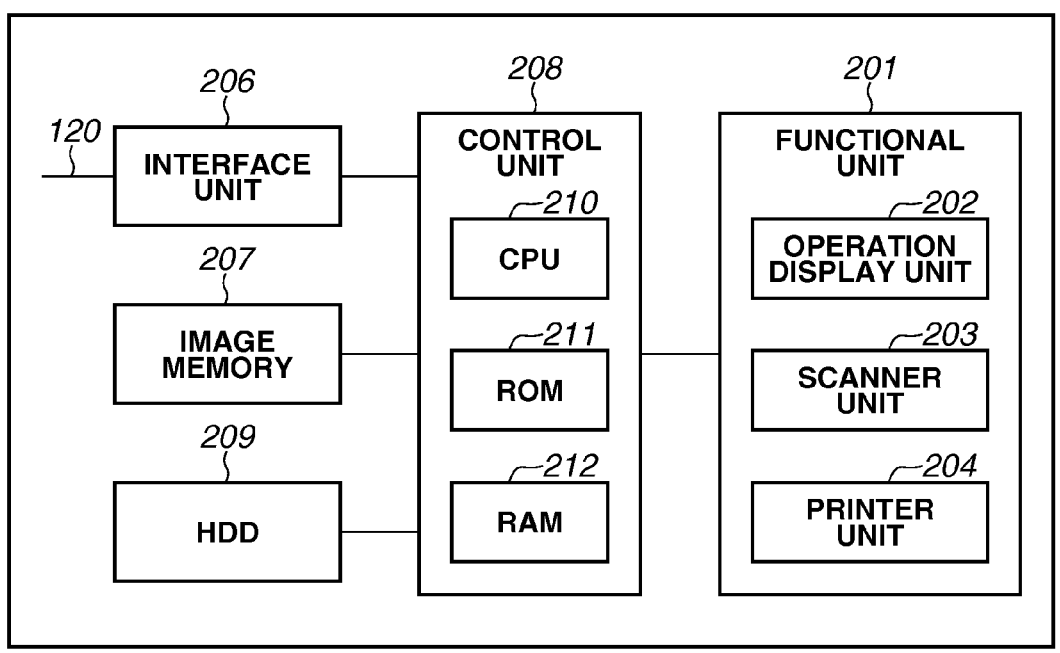
FIG. 2 is a configuration diagram of hardware of the image processing apparatus (multifunction peripheral (MFP)).

FIG. 2 is a block diagram illustrating an example of a hardware configuration of the MFP 110.

Referring to FIG. 2, a control unit 208, which includes a central processing unit (CPU) 210, a read-only memory (ROM) 211, and a random access memory (RAM) 212, controls operations of the entire MFP 110. The CPU 210 reads control programs stored in the ROM 211 and executes various control processing operations, such as reading control and transmission control. The RAM 212 is used as a temporary storage region, such as a main memory or a work area, for the CPU 210. Furthermore, the control unit 208 is connected to a functional unit 201 and controls operations of an operation display unit 202, a scanner unit 203, and a printer unit 204, which are included in the functional unit 201.

The operation display unit 202 is provided with a display unit, such as a liquid crystal display having a touch panel function, and a keyboard. The operation display unit 202 has a web browser function, which is provided by the web browser 111. The web browser 111 analyzes a HyperText Markup Language (HTML) file received from the server 100 or another information processing apparatus, and then displays, on the operation display unit 202, an operation screen generated based on the description of the analyzed HTML file.

The printer unit 204 prints image data output from the control unit 208 on a sheet. The scanner unit 203 reads the image of an original to generate image data and outputs the generated image data to the control unit 208. An interface unit 206 connects the control unit 208 to the network 120 to enable the control unit 208 to receive, from an external information processing apparatus (not illustrated), image data to be printed or image data to be displayed on the operation display unit 202. The image data to be printed received from the external information processing apparatus is temporarily stored into an image memory 207 and is then printed by the printer unit 204 via the control unit 208.

A hard disk drive (HDD) 209 is a storage device configured to store image data or various programs. The HDD 209 may be replaced by another storage device, such as a solid state drive (SSD).

Figure 3:
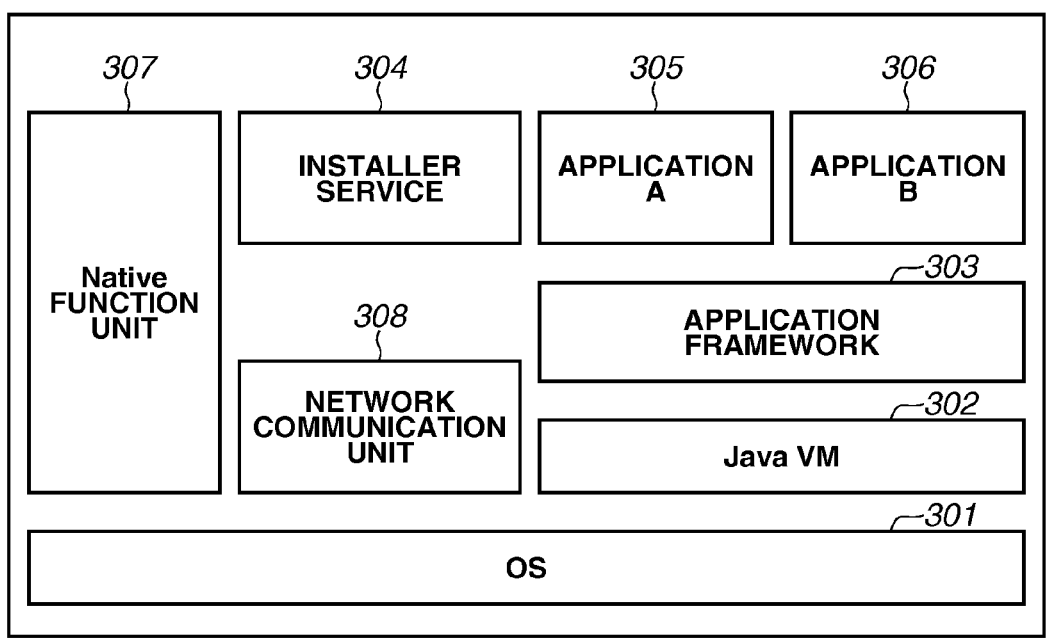
FIG. 3 is a configuration diagram of software of the image processing apparatus (MFP).

FIG. 3 illustrates an example of a hardware configuration of the MFP 110.

Various pieces of software 301 to 308 illustrated in FIG. 3, which are stored in the ROM 211 or the HDD 209, are executed by the CPU 210 to provide various functions to the MFP 110.

An operating system (OS) 301 is generally a real-time OS, but may be a general-purpose OS, such as Linux (registered trademark). A Java virtual machine (VM) 302, such as Java (registered trademark), provides an execution environment of applications. An application framework 303 provides a function to manage life cycles of applications. An installer service 304 performs installation processing by registering a plurality of applications, such as an application A 305 and an application B 306, with the application framework 303. The Java VM 302 or the application framework 303 may be included in the OS 301.

The application A 305 and the application B 306, which were installed by the installer service 304, provides various functions on the MFP 110. The application A 305 and the application B 306 can be downloaded from outside the MFP 110 (or can be read out from a recording medium) to be installed. Although, in the example illustrated in FIG. 3, two applications are installed, three or more applications may be installed.

At least one of the application A 305 and the application B 306 can interact with the user via the operation display unit 202. Furthermore, at least one of the application A 305 and the application B 306 can generate image data using the scanner unit 203.

In the present exemplary embodiment, the application A 305 is supposed to be the first application, and the application B 306 is supposed to be the second application. Thus, the application A 305 corresponds to the application A 112 or the web browser 111 illustrated in FIG. 1, and the application B 306 corresponds to the application B 113 illustrated in FIG. 1.

A Native function unit 307 provides functions incorporated in the MFP 110. Examples of the Native functions include a function to perform printing by the printer unit 204 based on print data received via the interface unit 206. In the present exemplary embodiment, it is supposed that execution modules of the Java VM 302, the application framework 303, the application A 305, and the application B 306 are stored in the HDD 209. Furthermore, it is supposed that an execution module of the Native function unit 307 is stored in the ROM 211.

The network communication unit 308 performs data communication with other devices connected to the network 120. For example, the web browser 111, which is mounted on the MFP 110, can acquire hypertext-type information from a web server on the network 120 and display the acquired information on the operation display unit 202. The network connection configuration of the network communication unit 308 is not limited to a wireless connection or wired connection.

Furthermore, in the present exemplary embodiment, the network communication unit 308 executes request transmission or exchanges data between the first application (for example, the application A 112 or the web browser 111) and an external service (for example, the web application 1001). Thus, the network communication unit 308 operates as a relay function for causing the first application and the external service to cooperate with each other.

Figure 4:
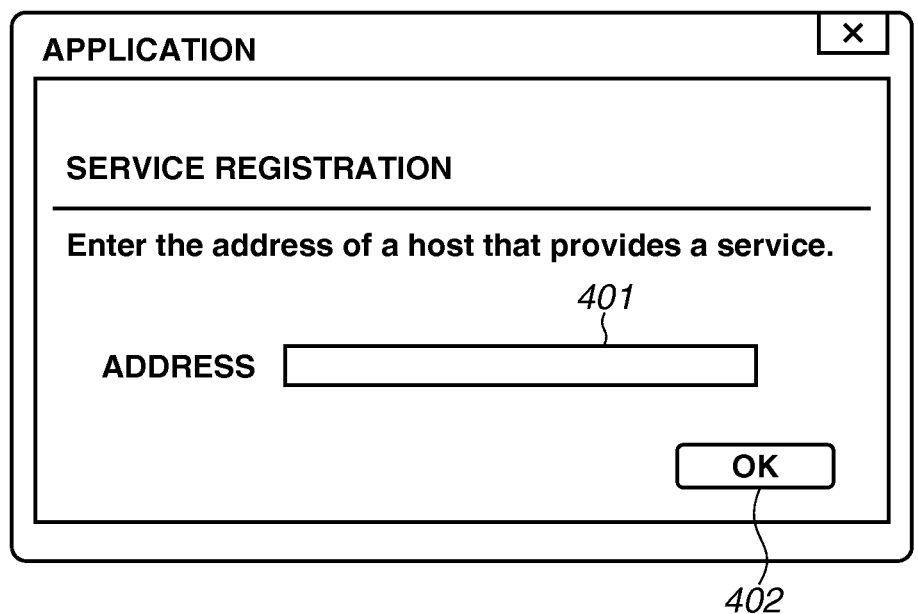
FIG. 4 illustrates an example of a service registration screen.

FIG. 4 illustrates an example of a service registration screen in the first application.

Examples of the first application include an application for generating image data using the scanner unit 203, then invoking an image processing service provided by a server present outside the MFP 110, processing the generated image data, and storing the processed image data into the HDD 209. Examples of the image processing service include a "photo editor" service for clipping photographic data at a predetermined size and an "icon creation" service for creating an icon usable for a web page from photographic data.

Furthermore, it is supposed that the first application is previously installed on the MFP 110 and is enabled. The user can register a service with the first application by, after activating the first application, invoking the service registration screen at a desired timing with a predetermined operation and then entering, via the operation display unit 202, the address of a server that provides the service.

In the present exemplary embodiment, Web Intents is used as an example of a unit for causing an application and a service to cooperate with each other. In other words, the cooperation between the first application and the external service is performed using a mechanism of Web Intents. Hereinafter, Web Intents is referred to as an "intent".

Referring to FIG. 4, the service registration screen contains an address entry field 401. The user can enter, into the address entry field 401, the address of a server that provides a service that the user wants to register. It is supposed that the address is to be entered in the Uniform Resource Locator (URL) format, and "index.html" is located immediately below the entered directory. It is supposed that an intent element such as that illustrated in FIG. 6, which is described below, is written in the header of "index.html". The intent element contains function information for invoking a service. The user can enter the address into the address entry field 401 and press an OK button 402 to acquire the intent element from a server with the entered address and to register the service. The service that has been registered via the service registration screen illustrated in FIG. 4 is registered with an intent list such as that illustrated in FIG. 7, which is described below.

Figure 5:
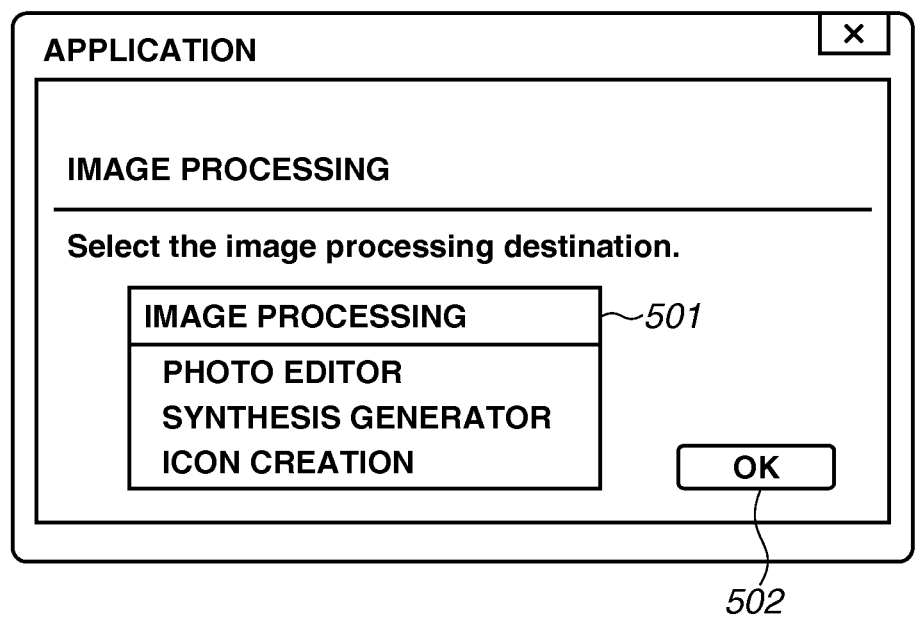
FIG. 5 illustrates an example of a service selection screen.

FIG. 5 illustrates an example of a service selection screen in the first application.

For example, the first application generates image data using the scanner unit 203 in response to the user instruction, then displays the service selection screen, and prompts the user to select an image processing destination via the service selection screen. The user selects a desired service from among image processing services (in the example illustrated in FIG. 5, "photo editor", "synthesis generator", and "icon creation") displayed in an image processing service list 501 and requests the selected service to perform image processing. When the image processing service has completed the image processing, the first application stores the processed image data into the HDD 209 and displays a completion screen (not illustrated) on the operation display unit 202.

The service selection screen illustrated in FIG. 5 contains the image processing service list 501. In the image processing service list 501, services related to image processing are displayed among the services entered in an intent list illustrated in FIG. 7, which is described below. The user can select a service in the image processing service list 501 and press an OK button 502 to request the service to perform image processing.

FIG. 6 illustrates an example of the intent element. The intent element is function information for invoking a function that a service on a network provides.

As mentioned in the foregoing, in the present exemplary embodiment, an intent is used as an example of a mechanism for joining applications software or functions included in software. An application displays a list of other applications or services that are able to perform processing on data to the user based on the intent element. The user, when wanting to perform some processing operation on data, specifies an application or service among the displayed applications or services, so that the user can perform a desired processing operation on the data without performing a special operation for passing the data to the specified application or service.

An html header that a web browser or the like acquires from a server based on a predetermined procedure contains an intent element indicated by <intent>. In the present exemplary embodiment, the network communication unit 308 reads the intent element and registers the read intent element with an intent list (FIG. 7), which is described below. The intent list indicates intent elements which are returned by servers that provide services for performing processing operations on image data in predetermined formats. Examples of the intent elements are as follows.

An element "action" indicates the category of a function that the service provides in the URL format. In other words, the element "action" indicates what function or service the provided function provides. In the example illustrated in FIG. 6, the element "action" means "edit". Examples of the categories of the provided functions include, besides the category "edit", which means editing of data, a category "share", which means sharing of data, a category "save", which means saving of data, a category "view", which means viewing of data, and a category "pick", which means acquisition of data.

An element "type" indicates the data format of content that the provided function is able to process. In the example illustrated in FIG. 6, "image" means image data, and "*" means all image formats. Furthermore, a specific image format, such as "jpeg" or "bmp", may be used instead of "*". Moreover, the element "type" may indicate a data format other than image data. For example, the element "type" may indicate a data format of text or audio data or a data format of a specific application.

An element "href" indicates the address at which the entity of the service is present. An html file, which is the entity of the service, is stored at the address indicated by the element "href". An element "title" indicates the title of the service.

A service of the intent in which the element "action" indicates "edit" and the element "type" indicates image data is listed as an image processing service, and a character string specified by the element "title" is displayed in the image processing service list 501 illustrated in FIG. 5.

FIG. 7 illustrates an example of the intent list according to the present exemplary embodiment.

The intent list is stored in a region previously allocated in a storage device, such as the HDD 209 or the RAM 212, and contains a list of external services registered via the service registration screen illustrated in FIG. 4.

Referring to FIG. 7, a column 701 represents an identifier (ID) in the list. A column 702 indicates a title. A column 703 indicates the storage location of an html file, which is the entity of the service. A column 704 indicates the type of data that the service handles. A column 705 indicates an action (function information that the service provides). A column 706 indicates the address of a server that provides an external service. The values of the elements "title", "href", "type", and "action" of the intent element that the external service specified via the service registration screen (FIG. 4) returns are respectively stored in the columns 702 to 705. In the example illustrated in FIG. 7, three external services are registered.

The record indicated by "ID=1" corresponds to a registration example in a case where the external service represented by "http://mysite.org" has returned the intent element illustrated in FIG. 6. An application conforming to intents (an application classified into the first application) can display, to the user, an external service registered with the intent list as a candidate for cooperation, as illustrated in FIG. 5.

Furthermore, the intent list illustrated in FIG. is common to all of the applications conforming to intents (the applications classified into the first application). Each service registered with the intent list is able to be invoked by any application classified into the first application.

Figure 8A:
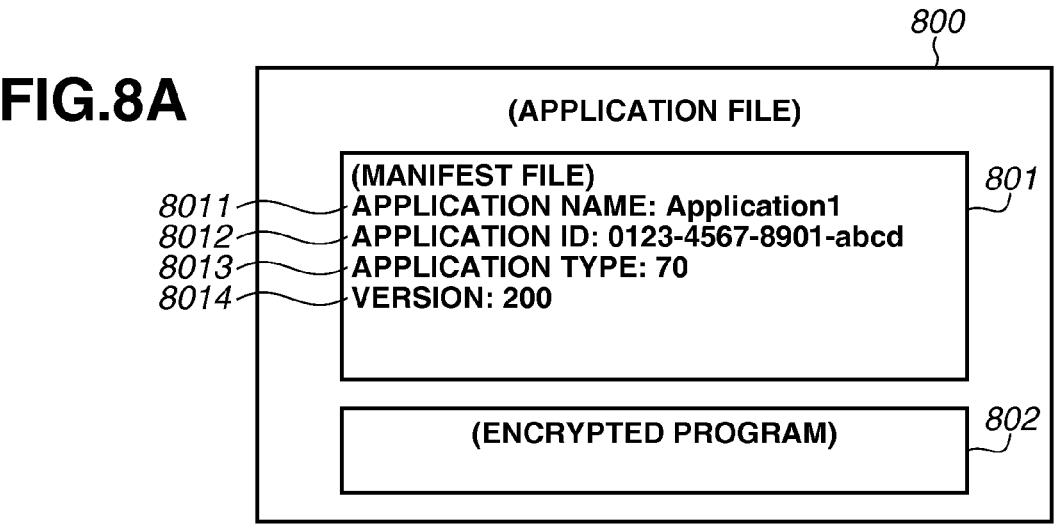
FIGS. 8A, 8B, and 8C illustrate examples of application files.
Figure 8B:
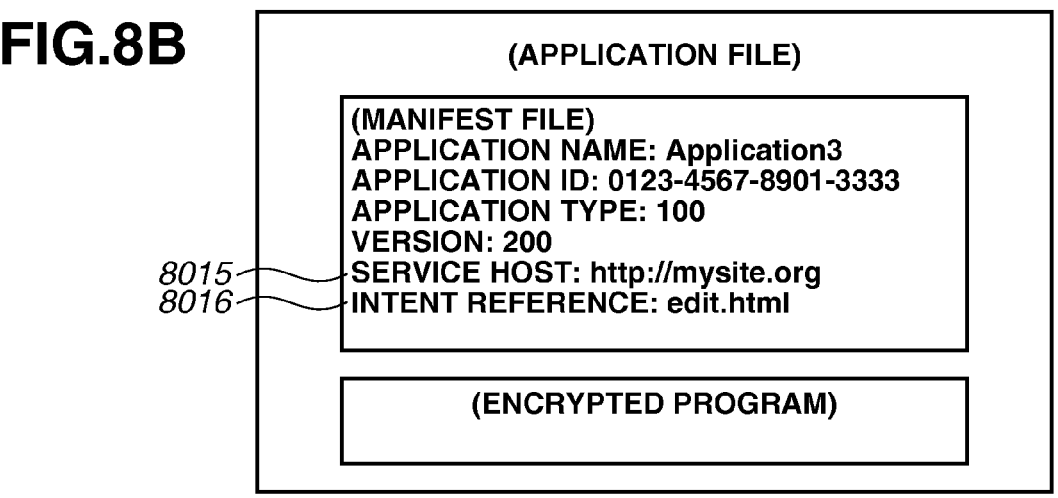

FIGS. 8A and 8B illustrate application files in the first exemplary embodiment.

Figure 8C:
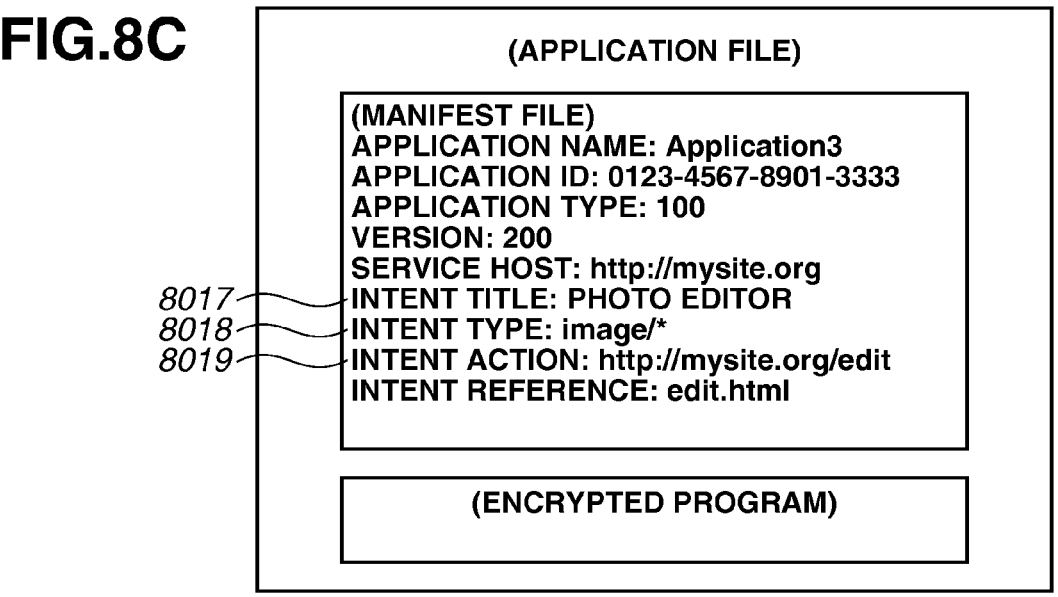

FIG. 8A illustrates an application file corresponding to the first application, and FIG. 8B illustrates an application file corresponding to the second application. FIG. 8C is described below in a third exemplary embodiment. The term "application file" means a file containing a file of an application program (which may be a compressed file) and its metadata file.

Referring to FIGS. 8A and 8B, an application file 800 itself is composed of a single file generated by compressing a plurality of files, such as a CAB file, a Java (registered trademark) Archive (JAR) file, and a ZIP file.

The application file 800 contains a manifest file 801 and an application program 802.

The manifest file 801 contains description of an application name, an application ID for uniquely identifying the present application, and application ancillary information, such as a version. The application program 802 is encrypted to prevent the program from being altered by a third party.

The application file 800 is distributed to users via a storage medium, such as a compact disc (CD), or a communication medium, such as the Internet, and is decrypted and executed by an MFP onto which the application file 800 is installed.

In the present exemplary embodiment, items to be described in the manifest file 801 are defined as follows. An application name 8011 represents the name of an application. An application ID 8012 represents an identifier for uniquely identifying the application. An application type 8013 represents the type of the application. If the value of the application type 8013 is "70", the type of the application is a general application, i.e., the first application in the present exemplary embodiment. If the value of the application type 8013 is "100", the type of the application is an application used to permit the MFP to use (cooperate with) an external service, i.e., the second application in the present exemplary embodiment. A version 8014 represents the version of the application.

A service host 8015 represents the address of a server that provides the service in the URL format. The address written in the service host 8015 is set as the address of a service which the application permits the MFP to use. An intent reference 8016 represents the reference of the entity of the service. The reference destination of the service is obtained by joining the service host 8015 and the intent reference 8016. The service host 8015 and the intent reference 8016 are set when the application type 8013 is "100", i.e., the second application. The service indicated by the reference destination specified by the service host 8015 and the intent reference 8016 means an external service with which the second application permits a specific application to cooperate.

Figure 9:
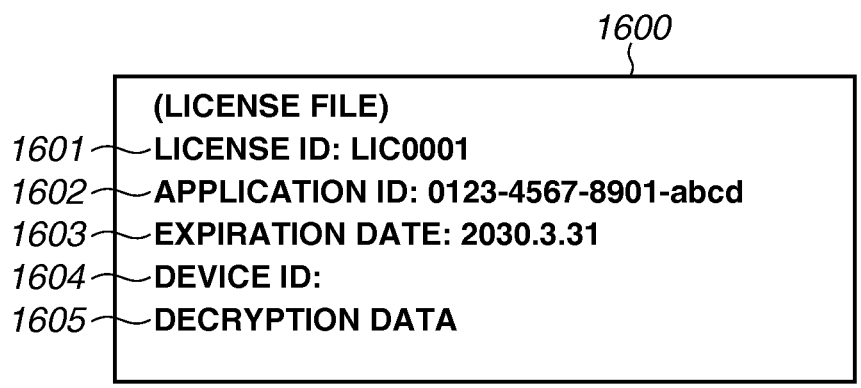
FIG. 9 illustrates an example of a license file.

FIG. 9 illustrates an example of a license file 1600 that is installed on the MFP 110 to enable an application in the first exemplary embodiment. In the present exemplary embodiment, items to be described in the license file 1600 are defined as follows.

Referring to FIG. 9, a license ID 1601 represents a unique ID for identifying a license. An application ID 1602 represents an ID for uniquely identifying an application that is a target for setting the license. An expiration date 1603 represents the expiration date for use of the application targeted for setting the license.

A device ID 1604 represents an ID (for example, a serial number) for uniquely identifying an MFP on which the application targeted for setting the license is able to be installed. Information used for decrypting the encrypted application program 802 of the application targeted for setting the license is stored in decryption data 1605.

The installer service 304 illustrated in FIG. 3 determines whether the application is enabled or disabled based on information described in a license file such as that 1600 illustrated in FIG. 9. If the following conditions are satisfied, the installer service 304 enables the license for the application.

The application ID 1602 described in the license file coincides with the application ID 8012 described in the manifest file of the target application.

The expiration date 1603 described in the license file is not exceeded (the license is enabled).

The device ID 1604 described in the license file coincides with a device ID acquired from an MFP targeted for installation of the application.

FIG. 10A illustrates an example of a list of applications that are generated and managed by the application framework 303 in the first exemplary embodiment. FIG. 10B is described below in the third exemplary embodiment.

Relevant information of the application installed via the installer service 304 is stored as appropriate in a region previously allocated in a storage device, such as the HDD 209 or the RAM 212. The relevant information includes, for example, information described in a manifest file and information required for application management.

Referring to FIG. 10A, a column 901 represents an index for discriminating between applications in the application list. A column 902 represents the name of an application. A column 903 represents an ID for uniquely identifying an application. A column 904 represents the type of an application. If the type 904 is "70", the type of an application is the first application. If the type 904 is "100", the type of an application is the second application.

A service host 905 represents the address of a host that provides a service. An application with the service host 905 in blank does not provide any service. A reference 906 represents the address of a storage location for an html file, which is the entity of a service. An expiration date 907 represents the expiration date for use of an application. A license 908 represents the ID of a license file.

Values of the columns 902 to 906 are set based on information described in a manifest file of the corresponding application. Furthermore, the expiration date 907 and the license 908 can be registered with the application list when the installer service 304 recognizes that the program, the manifest file, and the license file are not the forged ones based on a predetermined procedure. In the example illustrated in FIG. 10A, three applications are registered.

Operations of the first application are described below with reference to FIGS. 11, 12, 13, and 14.

Figure 11:
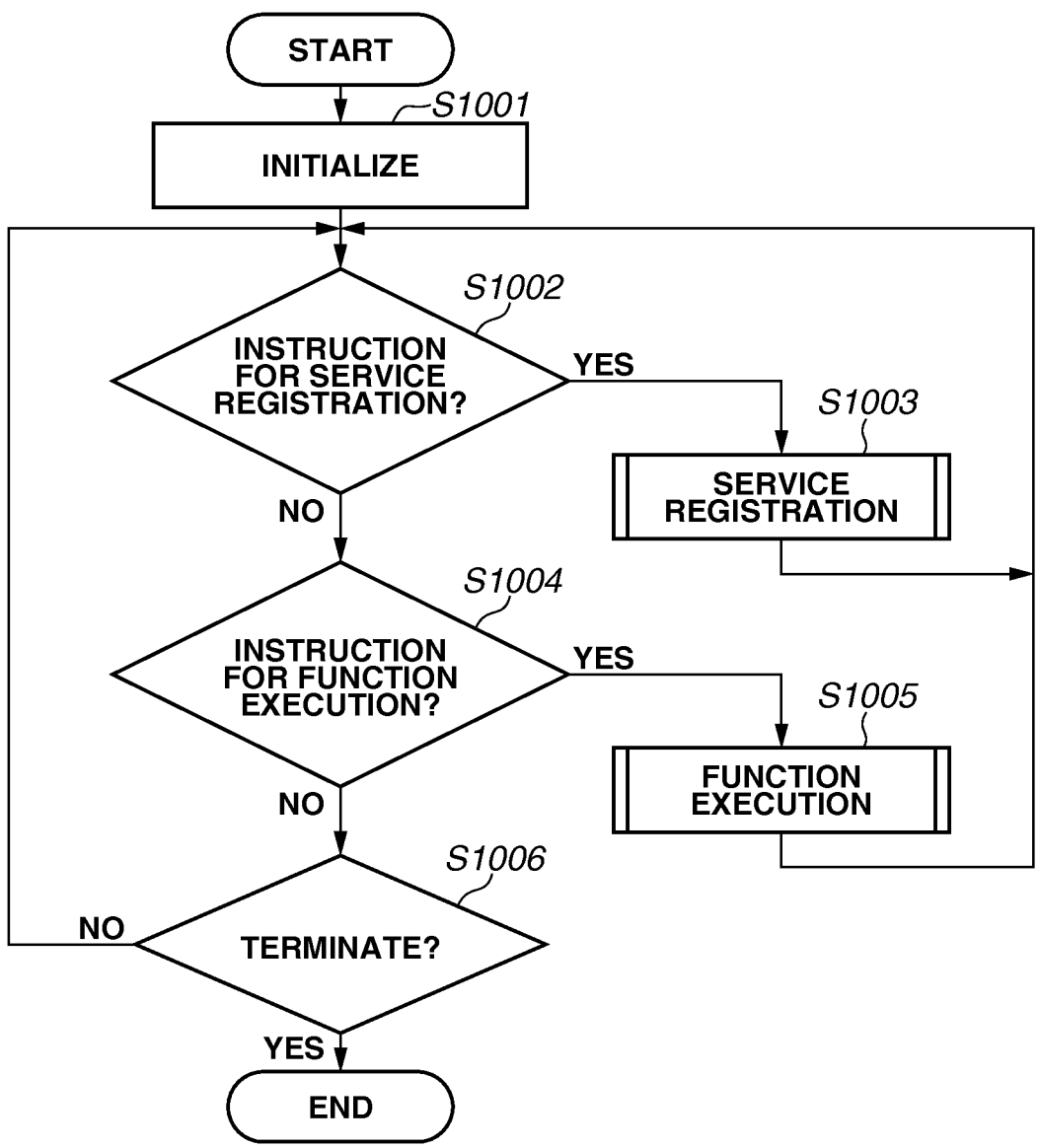
FIG. 11 is a flowchart illustrating an example of a basic operation of a first application.

FIG. 11 is a flowchart illustrating an example of a basic operation of the first application. Processing in the flowchart of FIG. 11 is implemented by the CPU 210 reading and executing a program stored in the ROM 211 or the HDD 209.

The first application, when activated, starts the processing in the flowchart of FIG. 11. First, in step S1001, the first application performs initialization based on a predetermined procedure. During the initialization, the first application allocates a work area in a storage device, such as the HDD 209 or the RAM 212.

Next, in step S1002, the first application determines whether an instruction for service registration has been received from the user. For example, when an address has been entered and the OK button 402 has been pressed on a service registration screen such as that illustrated in FIG. 4, the first application determines that an instruction for service registration has been received from the user.

If, in step S1002, the first application determines that an instruction for service registration has been received from the user (YES in step S1002), the processing proceeds to step S1003.

In step S1003, the first application performs service registration processing, which is described below. When the first application has completed the service registration processing, the processing returns to step S1002.

On the other hand, if, in step S1002, the first application determines that no instruction for service registration has been received from the user (NO in step S1002), the processing proceeds to step S1004.

In step S1004, the first application determines whether an instruction for function execution has been received from the user. Here, it is supposed that the "instruction for function execution" is an instruction for "scan execution" issued from the user in the first application. For example, when an operation indicating a scan instruction has been performed by the user via a scan instruction screen (not illustrated) of the first application, the first application determines that an instruction for function execution has been received from the user. The term "operation indicating a scan instruction" means, for example, an operation to press a "scan execution" button via a scan instruction screen (not illustrated).

Then, if, in step S1004, the first application determines that an instruction for function execution has been received from the user (YES in step S1004), the processing proceeds to step S1005.

In step S1005, the first application performs processing for function execution, which is described below. When the first application has completed the processing for function execution, the processing returns to step S1002.

On the other hand, if, in step S1004, the first application determines that no instruction for function execution has been received from the user (NO in step S1004), the processing proceeds to step S1006.

In step S1006, the first application determines whether a termination instruction has been received from the user. For example, when an operation indicating termination has been performed by the user via a termination instruction screen (not illustrated) of the first application, the first application determines that a termination instruction has been received from the user.

If, in step S1006, the first application determines that no termination instruction has been received from the user (NO in step S1006), the processing returns to step S1002.

On the other hand, if, in step S1006, the first application determines that a termination instruction has been received from the user (YES in step S1006), the processing ends.

Next, the service registration processing performed in step S1003 illustrated in FIG. 11 is described with reference to FIG. 12.

Figure 12:
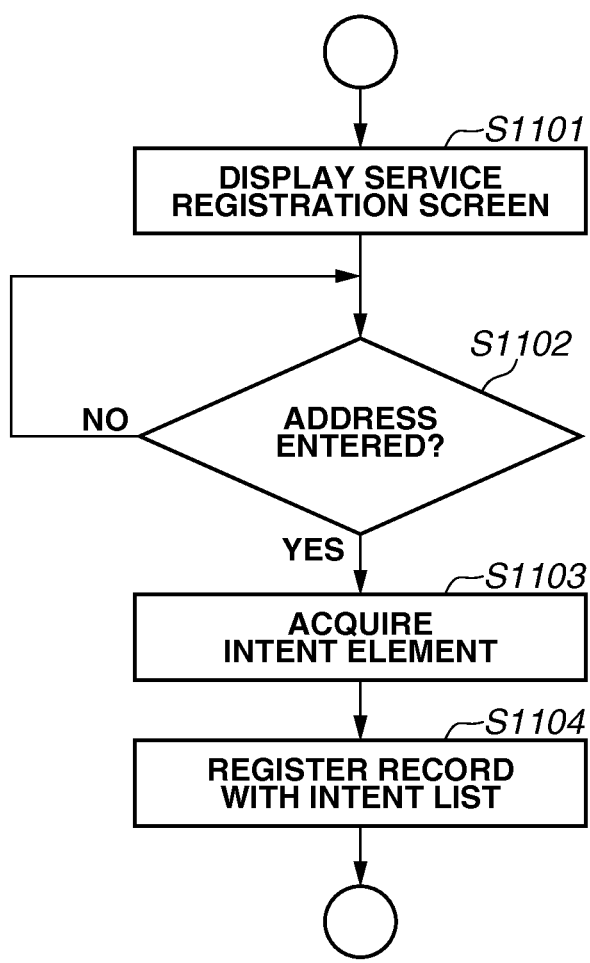
FIG. 12 is a flowchart illustrating an example of service registration processing according to a first exemplary embodiment.

FIG. 12 is a flowchart illustrating an example of the service registration processing in the first exemplary embodiment. Processing in the flowchart of FIG. 12 is implemented by the CPU 210 reading and executing a program stored in the ROM 211 or the HDD 209. Furthermore, a server that provides a service is able to return a plurality of intent elements as a response to an inquiry from the client. However, in the following description, for ease of description, it is supposed that the server returns a single intent element.

In step S1101, the first application displays the service registration screen, which is illustrated in FIG. 4, on the operation display unit 202.

Next, in step S1102, the first application determines whether an address has been entered via the service registration screen. For example, when an address for specifying a server has been entered into the address entry field 401 and the OK button 402 has been pressed by the user, the first application determines that an address has been entered. The entered address is stored into a work area previously prepared in a storage device, such as the HDD 209.

If, in step S1102, the first application determines that no address has been entered (NO in step S1102), the processing repeats the determination in step S1102. Furthermore, although not illustrated, in a case where the service registration screen is closed without an address being entered, the first application directly ends the service registration processing.

On the other hand, if, in step S1102, the first application determines that an address has been entered (YES in step S1102), the processing proceeds to step S1103.

In step S1103, the first application acquires an intent element. More specifically, the first application transmits a request from the network communication unit 308 to the server address, which is stored in the work area in step S1102, via the application framework 303. The server, when receiving the request, transmits, to the network communication unit 308, a response with a header containing an intent element such as that illustrated in FIG. 6. The network communication unit 308 extracts the intent element from the header of the response, generates one record for an intent list such as that illustrated in FIG. 7 based on the intent element, and stores the generated record into a work area allocated in a storage device such as the HDD 209.

Next, in step S1104, the network communication unit 308 adds and stores the record generated and stored in the work area in step S1103 to the intent list stored in a region previously prepared in a storage device such as the HDD 209. Then, the network communication unit 308 issues a notification to the first application indicating that the registration of the record with the intent list has been completed. When receiving the notification, the first application ends the service registration processing.

Next, the function execution processing performed in step S1005 illustrated in FIG. 11 is described with reference to FIG. 13.

Figure 13:
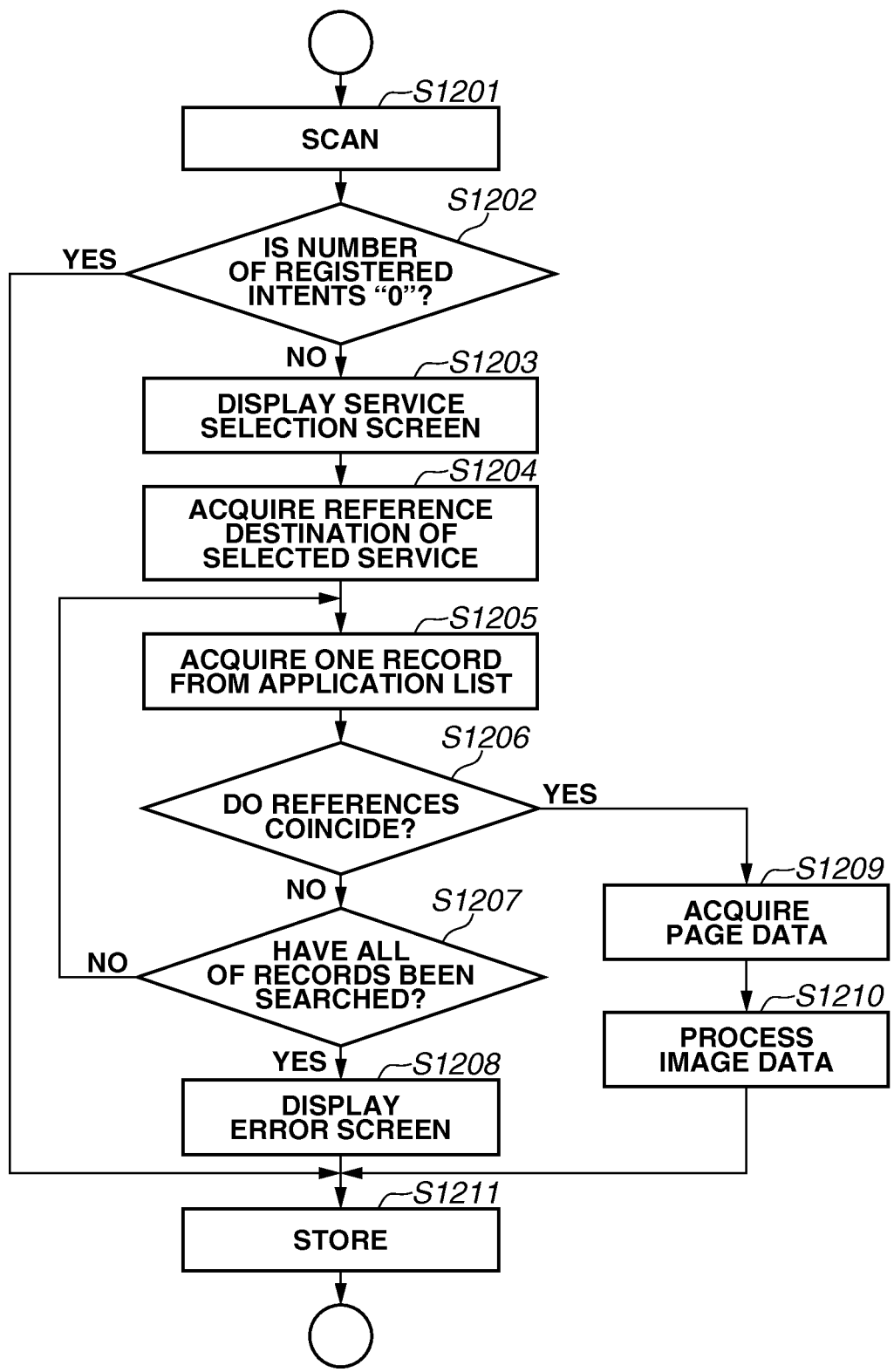
FIG. 13 is a flowchart illustrating an example of execution processing according to the first exemplary embodiment.

FIG. 13 is a flowchart illustrating an example of the function execution processing in the first exemplary embodiment. Processing in the flowchart of FIG. 13 is implemented by the CPU 210 reading and executing a program stored in the ROM 211 or the HDD 209. Furthermore, in the following description, it is supposed that the "function" is to process and store scanned image data.

First, in step S1201, the first application performs scan processing. More specifically, the first application acquires image data from the scanner unit 203 based on a predetermined procedure, and stores the acquired image data into a work area allocated in a storage device such as the HDD 209 via the control unit 208.

Next, in step S1202, the first application determines whether the number of registered intents is "0". More specifically, the first application checks the number of records in an intent list such as that illustrated in FIG. 7, which is stored in a region previously allocated in a storage device such as the HDD 209 or the RAM 212. If the number of records is "0", the first application determines that the number of registered intents is "0".

Then, if, in step S1202, the first application determines that the number of registered intents is "0" (YES in step S1202), the processing directly proceeds to step S1211.

On the other hand, if, in step S1202, the first application determines that the number of registered intents is not "0" (NO in step S1202), the processing proceeds to step S1203. In step S1203, the first application displays the service selection screen. More specifically, the first application refers to information of "type" (for example, "Image/*") and "action" (for example, "edit") of processing with which the first application intends to cooperate, and acquires information of the corresponding record from the intent list such as that illustrated in FIG. 7. Then, the first application generates the image processing service list 501 such as that illustrated in FIG. 5 based on the acquired information, generates the service selection screen such as that illustrated in FIG. 5, and displays the generated service selection screen on the operation display unit 202. Then, if a service is selected on the displayed service selection screen, the first application specifies a list item that is in a selected state from among the image processing service list 501. Then, the processing proceeds to step S1204. Furthermore, also in a case where there is no record in the intent list corresponding to "type" (for example, "Image/*") and "action" (for example, "edit") of processing with which the first application intends to cooperate, it is supposed that the processing directly proceeds to step S1211.

Next, in step S1204, the first application acquires the values of "host" 706 and "href" 703 from an intent corresponding to the service selected via the service selection screen, joins the acquired values to generate a reference destination of the service, and stores the reference destination into a work area previously allocated in the RAM 212 or the like. Furthermore, the first application requests the network communication unit 308 to collate the reference destination of the service.

In step S1205, the network communication unit 308 acquires one record from the application list such as that illustrated in FIG. 10A. More specifically, the network communication unit 308 acquires one record the expiration date 907 of which is not exceeded, from the application list illustrated in FIG. 10A (acquires information of an application the license of which is enabled), and stores the acquired record into a work area previously allocated in the RAM 212 or the like.

Next, in step S1206, the network communication unit 308 determines whether the references coincide. The network communication unit 308 determines that the references coincide in a case where a value generated from the service host 905 and the reference 906 of the record in the application list stored in the work area in step S1205 coincides with the reference destination of the service stored in the work area in step S1204. In other words, the network communication unit 308 determines that an application (the second application) that permits the MFP to use (to cooperate with) the user's desired service is present among applications which are installed on the MFP and the licenses of which are enabled.

If, in step S1206, the network communication unit 308 determines that the references do not coincide (NO in step S1206), the processing proceeds to step S1207.

In step S1207, the network communication unit 308 determines whether all of the records in the application list have been searched (the processing in steps S1205 to S1207 has been executed with respect to all of the records). If the network communication unit 308 determines that not all of the records in the application list have been searched (NO in step S1207), the processing returns to step S1205.

On the other hand, if, in step S1207, the network communication unit 308 determines that all of the records in the application list have been searched (YES in step S1207), since there is no application that permits the MFP to cooperate with the user's desired service, the network communication unit 308 notifies the first application of stopping the invocation of the service. Then, the processing proceeds to step S1208.

In step S1208, the first application displays an error screen (not illustrated) on the operation display unit 202. Then, the processing proceeds to step S1211. In other words, the cooperation of the MFP with the service selected by the user acquired in step S1204 is inhibited (stopped) since there is no application that permits the MFP to cooperate with the service in the list of applications installed on the MFP.

If, in step S1206, the network communication unit 308 determines that the references coincide (YES in step S1206), the processing proceeds to step S1209.

In step S1209, the network communication unit 308 acquires page data. More specifically, the network communication unit 308 accesses the reference destination of the service stored into the work area in step S1204, and acquires page data from the reference destination based on a predetermined procedure. It is supposed that the page data contains a script required for data processing, which is described below. The network communication unit 308 passes the acquired page data to the first application.

In step S1210, the first application processes image data stored into the work area allocated in a storage device such as the HDD 209 in step S1201, according to the script contained in the page data acquired in step S1209, and stores the processed image data into the work area. Then, the processing proceeds to step S1211.

In step S1211, the first application stores, as appropriate, the image data stored in the work area allocated in a storage device such as the HDD 209 into an image data storage region previously allocated in a storage device such as the HDD 209, and discards the image data stored in the work area. Then, the first application ends the function execution processing.

Next, the entire sequence of processing in the first exemplary embodiment is described with reference to FIG. 14.

Figure 14:
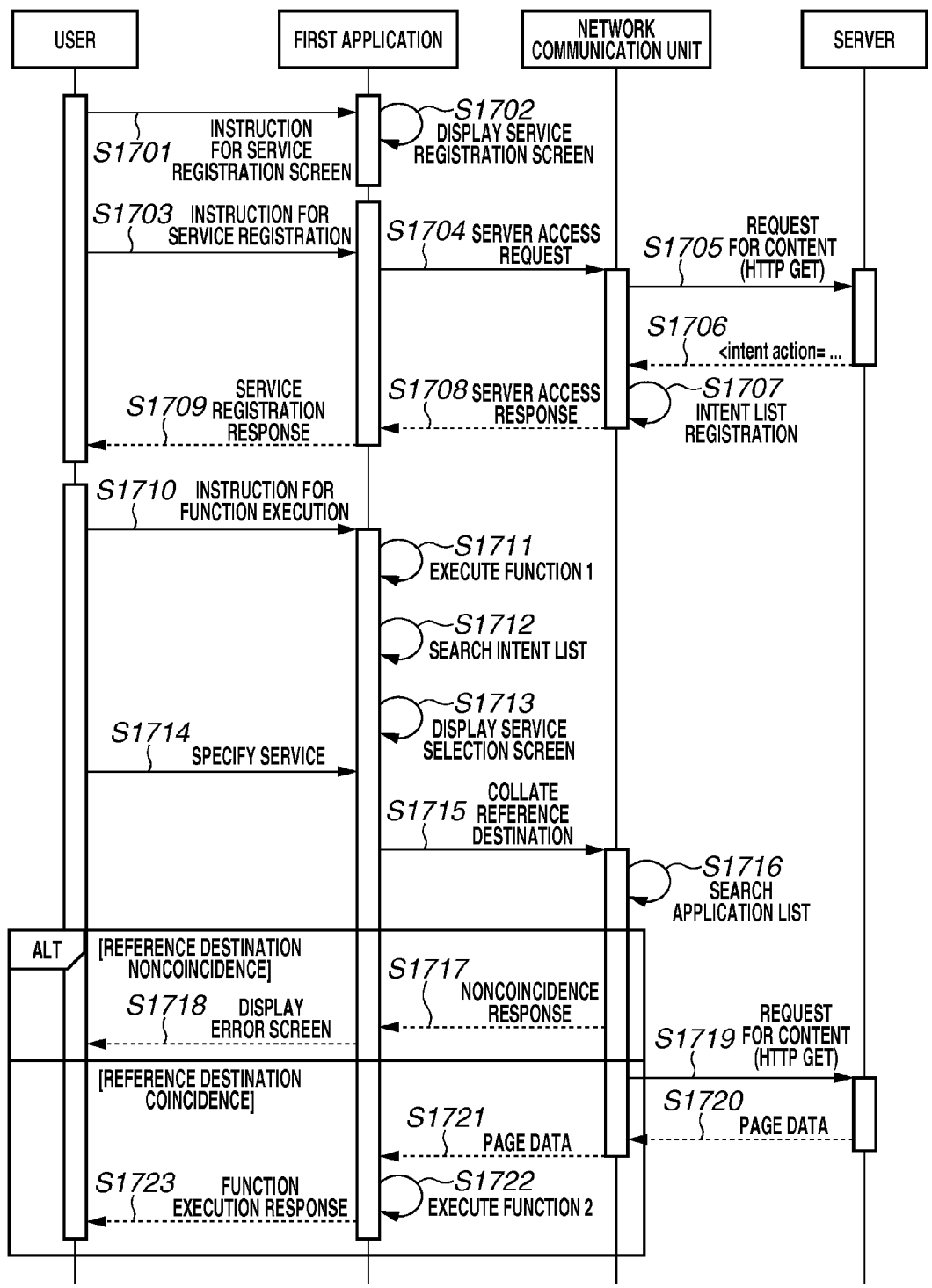
FIG. 14 is a sequence diagram illustrating the entire processing according to the first exemplary embodiment.

FIG. 14 is a sequence diagram illustrating the entire sequence of processing in the first exemplary embodiment.

In step S1701, the user instructs the first application to display the service registration screen.

In step S1702, the first application displays, on the operation display unit 202, the service registration screen, such as that illustrated in FIG. 4, in response to the instruction issued in step S1701. The present step corresponds to step S1101 in the flowchart of FIG. 12.

Next, in step S1703, the user instructs the first application, via the service registration screen displayed in step S1702, to register the service.

In step S1704, in response to the instruction issued in step S1703, the first application requests the network communication unit 308 to access a server specified by the instruction issued in step S1703.

In step S1705, in response to the request issued in step S1704, the network communication unit 308 requests content from the specified server based on a predetermined procedure. The present step corresponds to step S1103 in the flowchart of FIG. 12.

In step S1706, in response to the request issued in step S1705, the server returns, as a response, content containing an intent element to the network communication unit 308. Then, the network communication unit 308 receives the content sent as a response from the server.

Next, in step S1707, the network communication unit 308 adds an intent acquired in step S1706 to an intent list such as that illustrated in FIG. 7. The present step corresponds to step S1104 in the flowchart of FIG. 12.

Next, in step S1708, the network communication unit 308 returns, to the first application, a response indicating the success of service registration. Then, the first application receives the response.

Next, in step S1709, the first application generates a service registration success screen (not illustrated) and displays the service registration success screen on the operation display unit 202 to inform the user of the success of service registration.

Then, in step S1710, the user instructs the first application to execute functions included in the first application.

In step S1711, in response to the instruction issued in step S1710, the first application executes a function 1. Here, it is supposed that the function 1 is a scan function. The present step corresponds to step S1201 in the flowchart of FIG. 13.

Next, in step S1712, the first application acquires the intent list. For ease of description, a sequence performed in a case where the number of registered intents is "0" omitted. Furthermore, a sequence performed in a case where there is no intent of the type and action with which the MFP is intended to cooperate is also omitted.

Next, in step S1713, the first application generates a service selection screen, such as that illustrated in FIG. 5, based on the intent list acquired in step S1712 and displays the service selection screen on the operation display unit 202. The present step corresponds to step S1203 in the flowchart of FIG. 13.

Next, in step S1714, the user issues, to the first application via the service selection screen generated in step S1713, an instruction specifying a service with which the MFP is intended to cooperate.

In step S1715, in response to the instruction issued in step S1714, the first application requests the network communication unit 308 to collate the reference destination of the service specified by the user as a cooperation destination in step S1714.

In step S1716, in response to the request issued in step S1715, the network communication unit 308 searches an application list such as that illustrated in FIG. 10A, and checks whether there is a record in the application list coinciding with the reference destination. Then, the network communication unit 308 causes the processing to branch depending on a result of checking in step S1716.

If, in step S1716, the network communication unit 308 determines that there is no record coinciding with the reference destination (in the case of "reference destination noncoincidence"), the processing proceeds to step S1717.

In step S1717, the network communication unit 308 returns, to the first application, a response indicating the noncoincidence of the reference destination. Then, the first application receives the response from the network communication unit 308.

In step S1718, based on the response in step S1717, the first application displays an error screen (not illustrated) on the operation display unit 202. The present step corresponds to step S1208 in the flowchart of FIG. 13.

On the other hand, if, in step S1716, the network communication unit 308 determines that there is a record coinciding with the reference destination (in the case of "reference destination coincidence"), the processing proceeds to step S1719.

In step S1719, the network communication unit 308 issues a request for content to a server corresponding to the reference destination. The present step corresponds to step S1209 in the flowchart of FIG. 13.

In step S1720, in response to the request issued in step S1719, the server returns, to the network communication unit 308, page data as a response to the request issued in step S1719. Then, the network communication unit 308 receives the response from the server.

In step S1721, the network communication unit 308 returns, to the first application, the page data acquired in step S1720 as a response. Then, the first application receives the response from the network communication unit 308.

In step S1722, the first application executes a function 2. Here, it is supposed that the function 2 is a function to process the image data obtained by the function 1 executed in step S1711 and to store the processed image data into a storage device. In other words, the first application processes the image data, obtained in step S1711, using a script contained in the page data returned from the network communication unit 308 in step S1721, and stores the processed image data into the HDD 209. The present step corresponds to steps S1210 and S1211 in the flowchart of FIG. 13.

Next, in step S1723, the first application generates a completion screen (not illustrated) and displays the completion screen on the operation display unit 202 to inform the user of the completion of the processing.

As described above, according to the first exemplary embodiment, among services specified by the user as cooperation destinations at the time of execution of a first application, only a service for which a second application, which is used to permit the MFP to use the service, is enabled is permitted to be used. On the other hand, a service for which the second application is not enabled is not permitted to be used. This enables the first application to cooperate with only a service with which the MFP is permitted to cooperate among services specified by the user as cooperation destinations. In this way, the cooperation of the MFP with an external service can be managed based on the license of the second application installable on the MFP.

In steps S1209 and S1210 illustrated in FIG. 13 and steps S1719 to S1722 illustrated in FIG. 14, the MFP acquires page data containing a script from the server and processes image data according to the script. However, instead of steps S1209 and S1210 illustrated in FIG. 13 and steps S1719 to S1722 illustrated in FIG. 14, the first application may transmit image data acquired in step S1201 to the server, the server may process the image data, and the MFP may receive the processed image data from the server.

Furthermore, the service is not limited to processing of image data. For example, the service may be an operation for posting image data or comments to a viewing website of a social networking service (SNS). Furthermore, in a case where user authentication or a user's operation is required for the service to provide a function, the user may perform an operation on the operation display unit 202 of the MFP 110.

Furthermore, in the foregoing description, the network communication unit 308 is configured to register a service with an intent list (for example, step S1707 illustrated in FIG. 14). However, the first application or another function may register a service with an intent list. For example, a web browser may perform registration, or there may be dedicated software for registering a service with an intent list.

Furthermore, the network communication unit 308 may perform step S1712 ("SEARCH INTENT LIST") illustrated in FIG. 14 or step S1713 ("DISPLAY SERVICE SELECTION SCREEN") illustrated in FIG. 14. In this case, it is supposed that the first application notifies the network communication unit 308 of information of "type" (for example, "Image/*") and "action" (for example, "edit") of processing with which the MFP is intended to cooperate.

Moreover, the first application may perform step S1716 ("SEARCH APPLICATION LIST") illustrated in FIG. 14 and the processing for branching depending on a result of the search.

Additionally, a web browser may operate between the first application and the network communication unit 308, and the web browser may perform step S1702 ("DISPLAY SERVICE REGISTRATION SCREEN"), step S1707 ("INTENT LIST REGISTRATION"), step S1712 ("SEARCH INTENT LIST"), step S1713 ("DISPLAY SERVICE SELECTION SCREEN"), step S1716 ("SEARCH APPLICATION LIST"), and the processing for branching. In this case, it is supposed that the first application notifies the web browser of information of "type" (for example, "Image/*") and "action" (for example, "edit") of processing with which the MFP is intended to cooperate.

The above-described first exemplary embodiment is configured to search installed applications at the timing of execution of a service and to prevent other than a service or services that are permitted to be executed among the searched applications from being executed. On the other hand, the following second exemplary embodiment is configured to search installed applications at the timing of registering a service with an intent list and to prevent other than a service or services that are permitted to be executed among the searched applications from being registered with the intent list. For ease of description, a configuration of the second exemplary embodiment similar to that of the first exemplary embodiment is omitted from the following description, and only points different from those of the first exemplary embodiment are described. Hereinafter, the second exemplary embodiment is described with reference to FIGS. 15 and 16.

Figure 15:
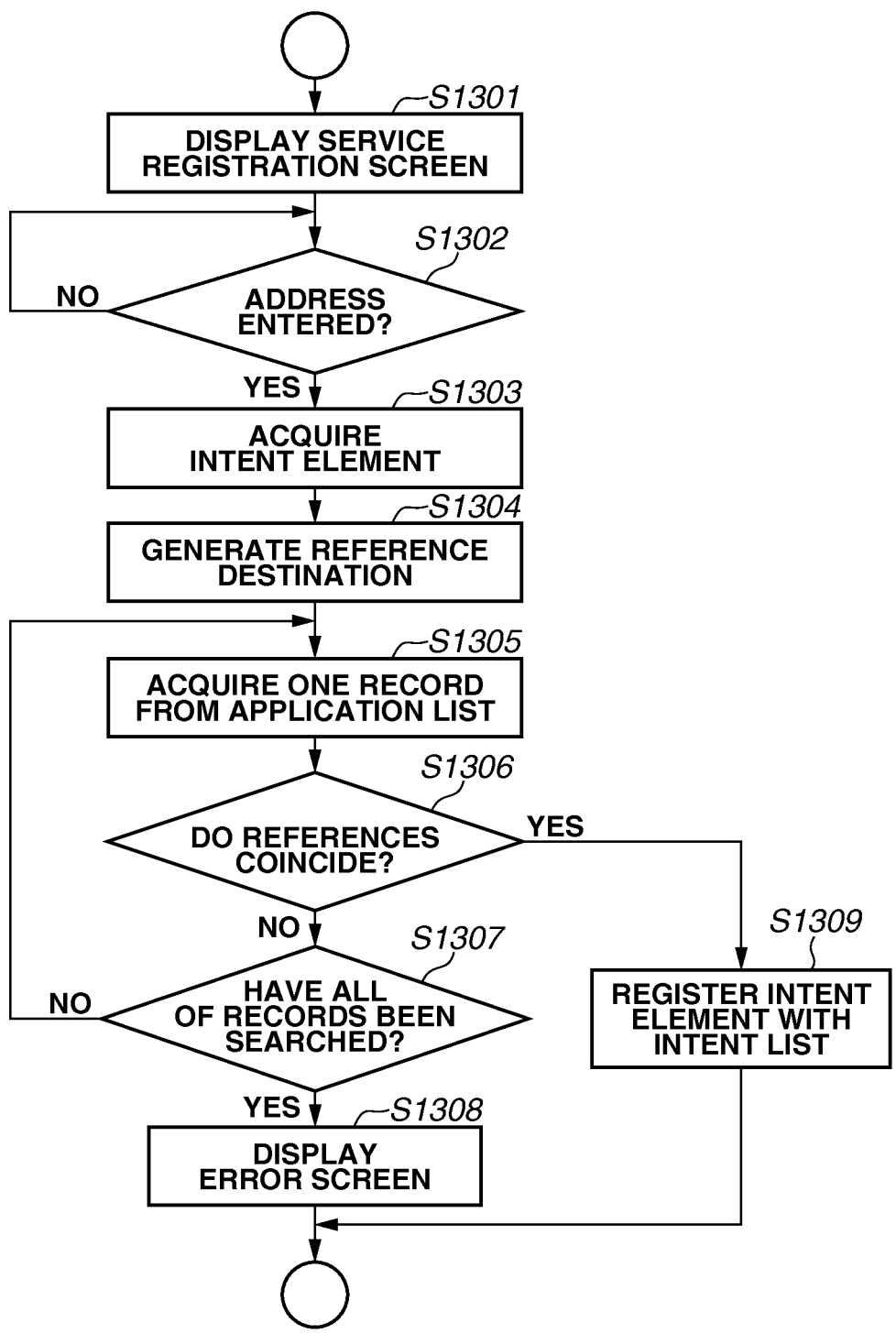
FIG. 15 is a flowchart illustrating an example of service registration processing according to a second exemplary embodiment.

FIG. 15 is a flowchart illustrating an example of service registration processing according to the second exemplary embodiment. Processing in the flowchart of FIG. 15 is implemented by the CPU 210 reading and executing a program stored in the ROM 211 or the HDD 209. Since steps S1301 to S1303 and step S1309 are respectively similar to steps S1101 to S1103 and step S1104 illustrated in FIG. 12, the description thereof is omitted and only different steps are described below.

In step S1304, the network communication unit 308 generates a reference destination for the entity of a service. More specifically, the network communication unit 308 joins the value of "href" of the intent element acquired in step S1303 and the address stored in the work area in step S1302 to generate a reference destination for the entity of a service, and stores the reference destination into a work area allocated in a storage device, such as the HDD 209.

Next, in step S1305, the network communication unit 308 acquires one record from the application list such as that illustrated in FIG. 10A. More specifically, the network communication unit 308 acquires one record the expiration date 907 of which is not exceeded, from the application list illustrated in FIG. 10A, and stores the acquired record into a work area previously allocated in the RAM 212 or the like.

Next, in step S1306, the network communication unit 308 determines whether the references coincide. The network communication unit 308 determines that the references coincide in a case where the reference destination of the service stored in the work area in step S1304 coincides with a value generated from "service host" and "reference" of the record in the application list stored in the work area in step S1305. In other words, the network communication unit 308 determines that an application (the second application) that permits the MFP to cooperate with the user's desired service is present among applications which are installed on the MFP and the licenses of which are enabled.

If, in step S1306, the network communication unit 308 determines that the references do not coincide (NO in step S1306), the processing proceeds to step S1307.

In step S1307, the network communication unit 308 determines whether all of the records in the application list have been searched (the processing in steps S1305 to S1307 has been executed with respect to all of the records). If the network communication unit 308 determines that not all of the records in the application list have been searched (NO in step S1307), the processing returns to step S1305.

On the other hand, if, in step S1307, the network communication unit 308 determines that all of the records in the application list have been searched (YES in step S1307), since there is no application that permits the MFP to cooperate with the user's desired service, the network communication unit 308 notifies the first application of stopping the registration of the service. Then, the processing proceeds to step S1308.

In step S1308, the first application displays an error screen (not illustrated) on the operation display unit 202. Then, the first application ends the service registration processing. In other words, the registration of the service specified by the user in step S1302 is inhibited (stopped) since there is no application that permits the MFP to cooperate with the service in the list of applications installed on the MFP.

If, in step S1306, the network communication unit 308 determines that the references coincide (YES in step S1306), the processing proceeds to step S1309.

In step S1309, the network communication unit 308 registers the intent element acquired in sep S1303 with an intent list such as that illustrated in FIG. 7, and issues a notification to the first application indicating that the intent element has been registered with the intent list. When receiving the notification, the first application ends the service registration processing.

Figure 16:
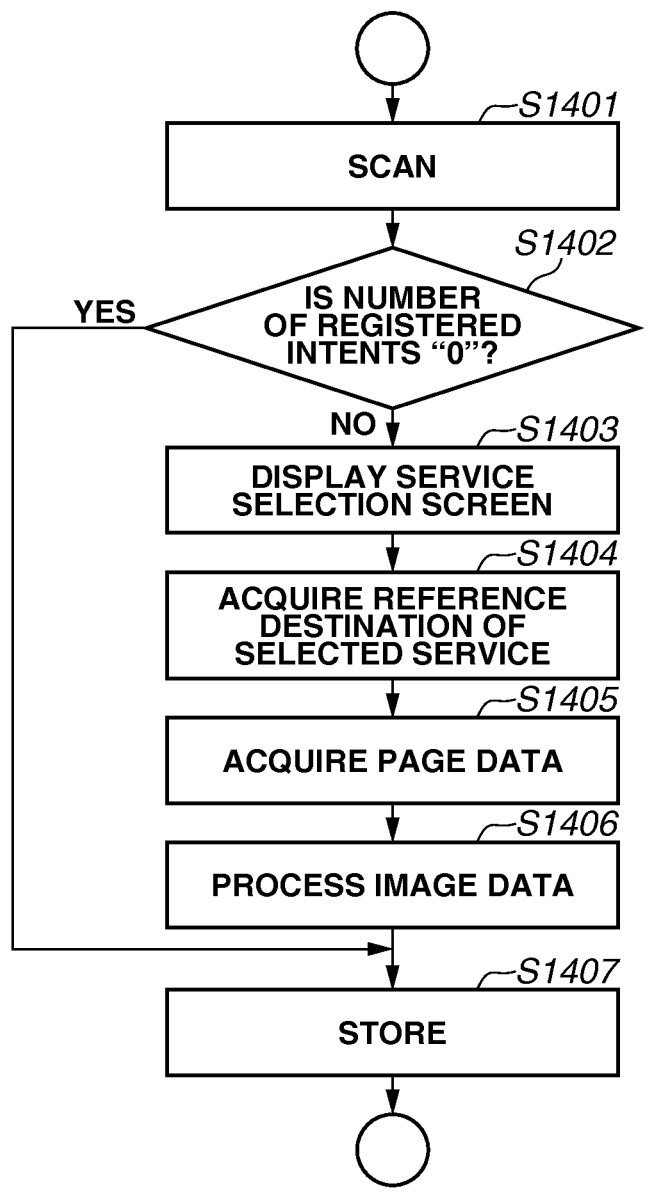
FIG. 16 is a flowchart illustrating an example of execution processing according to the second exemplary embodiment.

FIG. 16 is a flowchart illustrating an example of function execution processing according to the second exemplary embodiment. Processing in the flowchart of FIG. 16 is implemented by the CPU 210 reading and executing a program stored in the ROM 211 or the HDD 209. Since steps S1401 to S1404, steps S1405 and S1406, and step S1407 are respectively similar to steps S1201 to S1204, steps S1209 and S1210, and step S1211 illustrated in FIG. 13, the description thereof is omitted.

As described above, according to the second exemplary embodiment, only a service for which a second application, which is used to permit the MFP to use the service, is enabled at the time of registration of the service is permitted to be registered. On the other hand, a service for which the second application is not enabled is not permitted to be registered. This enables the first application to cooperate with only a service with which the MFP is permitted to cooperate among services specified by the user as cooperation destinations. In this way, the cooperation of the MFP with an external service can be managed based on the license of the second application installable on the MFP.

The above-described first and second exemplary embodiments are configured to acquire an intent element from a server that provides a service and to register the intent element with an intent list. On the other hand, the following third exemplary embodiment is not configured to acquire an intent element from a server that provides a service, but configured to allow an intent element to be previously described in a manifest of a second application and to acquire the intent element from the manifest. For ease of description, a configuration of the third exemplary embodiment similar to that of the first or second exemplary embodiment is omitted from the following description, and only points different from those of the first or second exemplary embodiment are described. Hereinafter, the third exemplary embodiment is described with reference to FIGS. 8C, 10B, and 17.

FIG. 8C illustrates an application file corresponding to the second application in the third exemplary embodiment. Here, only points different from those illustrated in FIG. 8B are described.

A manifest file illustrated in FIG. 8C contains, in addition to the constituents illustrated in FIG. 8B, an intent title 8017, an intent type 8018, and an intent action 8019. In other words, the third exemplary embodiment is configured to describe, in the manifest file, the same information as the information described in an intent element sent as a response from a server that provides a service, together with the intent reference 8016.

Although details are described below, the third exemplary embodiment is configured to generate information to be registered with an intent list, using information of the intent title 8017, the intent type 8018, and the intent action 8019 in the manifest file. For ease of description, it is supposed that the server that provides a service returns one intent, and one intent is described in the manifest illustrated in FIG. 8C.

FIG. 10B illustrates an example of a list of applications (an application list) generated and managed by the application framework 303 in the third exemplary embodiment. Information of an application installed via the installer service 304 is stored as appropriate in a region previously allocated in a storage device such as the HDD 209 or the RAM 212.

A difference between FIG. 10A and FIG. 10B is an intent ID 909 illustrated in FIG. 10B. The intent ID 909 indicates an ID in the intent list illustrated in FIG. 7. In a row in which a numerical value is stored in the intent ID 909, the intent of a service that is permitted by the corresponding application to be accessed by the MFP is indicated by the ID in the intent list.

FIG. 17 is a flowchart illustrating an example of function execution processing in the third exemplary embodiment. Processing in the flowchart of FIG. 17 is implemented by the CPU 210 reading and executing a program stored in the ROM 211 or the HDD 209. Since steps S1501 and S1502 and steps S1505 and S1506 are respectively similar to steps S1301 and S1302 and steps S1307 and S1308 illustrated in FIG. 15, the description thereof is omitted and only different steps are described below.

The first application requests the network communication unit 308 to check the server address stored in the work area in step S1502.

In step S1503, the network communication unit 308 acquires one record from the application list such as that illustrated in FIG. 10B. More specifically, the network communication unit 308 acquires one record the expiration date 907 of which is not exceeded, from the application list illustrated in FIG. 10A, and stores the acquired record into a work area previously allocated in the RAM 212 or the like.

Next, in step S1504, the network communication unit 308 determines whether the addresses about the server that provides an external service coincide. The network communication unit 308 determines that the addresses about the server that provides an external service coincide in a case where the address entered in step S1502 and stored in the work area coincides with the value of the service host 905 of the record in the application list acquired in step S1503.

If, in step S1504, the network communication unit 308 determines that the addresses about the server that provides an external service do no coincide (NO in step S1504), the processing proceeds to step S1505.

On the other hand, if, in step S1504, the network communication unit 308 determines that the addresses about the server that provides an external service coincide (YES in step S1504), the processing proceeds to step S1507.

In step S1507, the network communication unit 308 acquires an intent element. More specifically, the first application acquires information of the intent element (for example, the intent title 8017, the intent type 8018, and the intent action 8019) from the manifest file 801 corresponding to the record in the application list acquired in step S1503, generates one record for an intent list such as that illustrated in FIG. 7 based on the intent element, and stores the generated record into a work area allocated in a storage device such as the HDD 209.

Next, in step S1508, the first application adds and stores (registers) the one record for an intent list stored in the work area in step S1508 to the intent list stored in a region previously prepared in a storage device such as the HDD 209. Furthermore, the first application registers the value of the ID 701 of the registered record in the intent list with the intent ID 909 of the record in the application list acquired in step S1503.

Furthermore, although not illustrated, in a case where a value is already stored in the intent ID 909 of the record in the application list in which the addresses coincide in step S1504, the first application determines that the corresponding service is already registered with the intent list, thus directly ending the service registration processing. In this instance, the first application may display, on the operation display unit 202, a message indicating that the corresponding service is already registered, thus informing the user of that effect.

Furthermore, at the time of registration of the second application, the installer service 304 may register the path of the application file 800 (or the manifest file 801) of the second application with the application list. Then, the network communication unit 308 may find the manifest file 801 using information of the path and register the service with the intent list (in steps S1507 and S1508 illustrated in FIG. 17).

Furthermore, at the time of registration of the second application, the installer service 304 may register information of the intent title 8017, the intent type 8018, and the intent action 8019 with the application list. Then, the first application may register the service with the intent list using information contained in the application list (in steps S1507 and S1508 illustrated in FIG. 17).

Moreover, at the time of registration of the second application, the installer service 304 may register, with the intent list, a service with which the second application permits the MFP to cooperate, using information of the manifest file 801 (the service host 8015, the intent title 8017, the intent type 8018, the intent action 8019, and the intent reference 8016).

As described above, according to the third exemplary embodiment, if an application that permits the MFP to cooperate with a service specified by the user is enabled, an intent element of the service can be acquired from the application and then registered with an intent list. Accordingly, processing for accessing a server that provides the service at the time of service registration can be omitted, and the registration of the service with a device can be completed even if the server is temporarily unable to be accessed, for example, even if the server is not powered on, at the time of service registration. This enables the first application to cooperate with only a service with which the MFP is permitted to cooperate among services specified by the user as cooperation destinations. In this way, the cooperation of the MFP with an external service can be managed based on the second application installable on the MFP.

Furthermore, the MFP 110 in the second exemplary embodiment and the third exemplary embodiment periodically checks the application list. Then, if the intent of a service with which an application the expiration date 907 of which is exceeded permits the MFP to cooperate is registered with the intent list, the MFP 110 deletes the registration of the intent from the intent list. Alternatively, the MFP 110 periodically checks the application list. Then, if the intent of a service with which an application that is not present (that is uninstalled) permits the MFP to cooperate is registered with the intent list, the MFP 110 deletes the registration of the intent from the intent list. Alternatively, if a second application is uninstalled (deleted) and the intent of a service with which the second application permits the MFP to cooperate is registered with the intent list, the MFP 110 deletes the registration of the intent from the intent list.

In the above-described first to third exemplary embodiments, the operation of the second application does not affect the operations of the first application and an external service and the cooperation action. Accordingly, when the present invention is applied, the second application does not need to be activated. Furthermore, the present invention can be applied even when the second application is implemented as a program that can be activated or a program that cannot be activated.

Moreover, while an example has been described in which the first application and the second application are applications that are additionally installed, the present invention can be applied even if either or both of the first application and the second application are implemented as functions (Native functions) previously provided to an image processing apparatus. Additionally, the present invention can be applied even if the first application is used as a web browser and a web application cooperates with a service.

Furthermore, while an example has been described in which a service with which the first application cooperates is used as an external service, the present invention can be applied even if the service with which the first application cooperates is a function (Native function) previously provided to an image processing apparatus. In other words, some functions that are incorporated in the MFP as Native functions can be configured to be unable to be executed unless the second application is enabled. Accordingly, some of functions that are incorporated in the MFP as Native functions can be configured to be unable to be used until after the license of the second application is purchased and the second application is enabled. In other words, the present invention can be applied even when a combination of the first application and the service runs within the same system (within the same apparatus).

Furthermore, a function for causing the first application and an external service to cooperate with each other can be implemented by the OS 301.

In the above-described first to third exemplary embodiments, an MFP is taken as an example of an information processing apparatus on which a first application that cooperates with an external service runs. However, examples of the information processing apparatus can include a computer peripheral apparatus, such as a printer, a scanner, and a camera, a personal computer, a smartphone, a tablet computer, a car navigation apparatus, a television apparatus, a hard disk recorder, and other home electric appliances connectable to networks.

Furthermore, in the above-described first to third exemplary embodiments, Web Intents is used as a technique for cooperation with a (web) application. However, Web Intents is merely an example, and another mechanism for allowing a client and a service to cooperate with each other via a similar relay function may be used. For example, another technique called Web Activities may be used, or a similar proprietary specification may be used to implement the present invention. In such a case, pieces of information equivalent to "action", "type", "href", and "title" may be defined with different names.

As described above, according to each exemplary embodiment of the present invention, an MFP can access only a service with which the MFP is permitted to cooperate among services specified by the user as cooperation destinations. Therefore, the first application is enabled to cooperate with only a service with which the MFP is permitted by the second application to cooperate.

Furthermore, only a service with which the MFP is permitted to cooperate at the time of service registration can be registered with an intent list. Therefore, the first application is enabled to cooperate with only a service with which the MFP is permitted by the second application to cooperate.

Moreover, a service with which the MFP is permitted to cooperate can be registered without accessing a server at the time of service registration. Therefore, the first application is enabled to cooperate with only a service with which the MFP is permitted by the second application to cooperate.

Accordingly, for example, without the provision of a special license management function on an external service or an external server that provides the external service, an external service with which an application running on an image processing apparatus cooperates can be managed based on a license associated with the image processing apparatus. Thus, the use of the external service by the image processing apparatus can also be managed in a similar way as that of the application running on the image processing apparatus. In this way, the cooperation between an information processing apparatus, such as an MFP, and a service can be appropriately managed. Therefore, any decrease in security, which may be caused by an application cooperating, without permission, with a service that should be prevented from cooperation from a viewpoint of security, can be prevented or reduced.

Furthermore, the configuration and content of the above-mentioned various data are not restrictive. Various configurations and contents can be used according to uses and purposes.

While various exemplary embodiments have been described above, the present invention can be embodied in the form of, for example, a system, an apparatus, a method, a program, or a storage medium. Specifically, the present invention can be applied to a system composed of a plurality of devices, or can be applied to an apparatus composed of a single device.

Furthermore, a configuration obtained by combining some or all of the above-described exemplary embodiments is also encompassed by the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-117650 filed Jun. 6, 2014, which is hereby incorporated by reference herein in its entirety.

What is claimed is:

1. An information processing apparatus in which a relay function operates to cooperate with a service provided on a network, the information processing apparatus comprising:
   a memory storing one or more sets of instructions; and
   a processor in communication with the memory, the processor, when executing the one or more sets of instructions, controls
   a management unit configured to manage a plurality of applications installed on the information processing apparatus, the plurality of applications including applications categorized into a first application capable of using the service provided on the network;
   a checking unit configured to check, with the management unit, a second application different from the applications categorized into the first application and installed to use the service provided on the network, wherein the second application is used for enabling the applications categorized into the first application to use the service provided on the network; and
   a control unit configured to control, according to a result of checking by the checking unit, registration processing by the relay function for registering function information used to cooperate with the service provided on the network or invocation processing by the relay function for invoking the service provided on the network using the registered function information,
   wherein the control unit is configured to stop, if the result of checking indicates that the second application has not been installed, the registration processing or the invocation processing by the relay function.

2. The information processing apparatus according to claim 1, wherein, if the result of checking indicates that the second application exists, the control unit executes the registration processing or the invocation processing by the relay function.

3. The information processing apparatus according to claim 1, wherein the management unit is implemented by an operating system.

4. The information processing apparatus according to claim 1, wherein the first application includes a web browser.

5. The information processing apparatus according to claim 1, wherein the information processing apparatus is a computer peripheral apparatus including at least one of a printer, a scanner, and a camera.

6. The information processing apparatus according to claim 1, wherein the management unit manages, based on a license, an application installed on the information processing apparatus.

7. The information processing apparatus according to claim 6, wherein the checking unit determines that the second application exists if the second application has been installed and a license of the second application is enabled, and further determines that the second application does not exist if a license of the second application is disabled.

8. The information processing apparatus according to claim 6, wherein the control unit deletes registration of the function information if the second application has been deleted or a license of the second application has become disabled.

9. The information processing apparatus according to claim 1, wherein the invocation processing uses a mechanism of Web Intents or Web Activities.

10. A method for an information processing apparatus in which a relay function operates to cooperate with a service provided on a network, the method comprising:
managing a plurality of applications installed on the information processing apparatus, the plurality of applications including applications categorized into a first application capable of using the service provided on the network;
checking a second application different from the applications categorized into first application and installed to use the service provided on the network, the second application is used to enable the applications categorized into the first application to use the service provided on the network;
controlling, according to a result of the checking, registration processing by the relay function for registering function information used to cooperate with the service provided on the network or invocation processing by the relay function for invoking the service provided on the network using the registered function information, and
stopping, if the result of checking indicates that the second application has not been installed, the registration processing or the invocation processing by the relay function.

11. A non-transitory computer-readable storage medium storing a computer program that causes a computer to execute a method for an information processing apparatus in which a relay function operates to cooperate with a service provided on a network, the method comprising:
managing a plurality of applications installed on the information processing apparatus, the plurality of applications including applications categorized into a first application capable of using the service provided on the network;
checking a second application different from the applications categorized into first application and installed to use the service provided on the network, the second application is used to enable the applications categorized into the first application to use the service provided on the network;
controlling, according to a result of the checking, registration processing by the relay function for registering function information used to cooperate with the service provided on the network or invocation processing by the relay function for invoking the service provided on the network using the registered function information, and
stopping, if the result of checking indicates that the second application has not been installed, the registration processing or the invocation processing by the relay function.

* * * * *